United States Patent
Hendrikx et al.

(10) Patent No.: US 12,283,182 B2
(45) Date of Patent: Apr. 22, 2025

(54) DYNAMIC CONTROL OF VEHICLE DRIVETRAIN MODES

(71) Applicant: Ford Global Technologies, LLC, Dearborn, MI (US)

(72) Inventors: Roy Hendrikx, Kinrooi/Limburg (BE); Stuart Easson, Santa Cruz, CA (US); Adam Weber, Kingsfsord, MI (US); Rathi Munukur, San Jose, CA (US); Tariq Alexander Willis, St. Albans/Hertfordshire (GB); Michael Huynh, Cologne (DE); Alexandra Holz, Aachen/NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 629 days.

(21) Appl. No.: 17/531,137

(22) Filed: Nov. 19, 2021

(65) Prior Publication Data

US 2022/0165152 A1    May 26, 2022

(30) Foreign Application Priority Data

Nov. 25, 2020  (EP) .................................... 20209880

(51) Int. Cl.
    *G08G 1/01*      (2006.01)
    *B60W 20/30*     (2016.01)
    (Continued)

(52) U.S. Cl.
    CPC ........... *G08G 1/0145* (2013.01); *B60W 20/30* (2013.01); *G08G 1/0125* (2013.01); *H04L 9/0643* (2013.01); *H04L 9/50* (2022.05)

(58) Field of Classification Search
    CPC .................................................. G08G 1/0145
    See application file for complete search history.

(56) References Cited

U.S. PATENT DOCUMENTS

| 7,164,986 | B2 | 1/2007 | Humphries et al. |
| 7,497,198 | B2 * | 3/2009 | Leone ................. B60W 10/06 123/295 |

(Continued)

FOREIGN PATENT DOCUMENTS

| DE | 102013223331 A1 | 5/2015 |
| GB | 2547714 A | 8/2017 |

(Continued)

OTHER PUBLICATIONS

NPL, Denby, B. et al., Interpolation and assimilation methods for European scale air quality assessment and mapping, European Topic Center on Air and Climate Change (Dec. 2005)(Hereinafter "Denby"). (Year: 2005).*

(Continued)

*Primary Examiner* — Jean Paul Cass
(74) *Attorney, Agent, or Firm* — Emily Drake; Brooks Kushman P.C.

(57) ABSTRACT

A computer-implemented method for establishing at least one low or zero emission traffic zone and for controlling and monitoring a dynamically operated drivetrain of hybrid vehicles passing through the at least one established low or zero emission traffic zone is provided. The method includes: acquiring data from air quality-sensitive sensors placed within a region including the at least one low or zero emission traffic zone to be established; operating a cloud-based service for evaluating the acquired data regarding air quality; wirelessly transmitting signals representative of a location and a shape of the at least one low or zero emission traffic zone to hybrid vehicles; operating vehicle-based mode transition means for at least initiating a change of a drivetrain mode of the hybrid vehicle to electric mode; generating a blockchain data block including data regarding the current position and the dynamically operated drivetrain (Continued)

of the hybrid vehicle; and adding the generated blockchain data block to a blockchain residing in a blockchain system.

11 Claims, 3 Drawing Sheets

(51) Int. Cl.
*H04L 9/00* (2022.01)
*H04L 9/06* (2006.01)

(56) References Cited

U.S. PATENT DOCUMENTS

| | | | | |
|---|---|---|---|---|
| 7,506,711 | B2* | 3/2009 | Usoro | B60W 10/06 |
| | | | | 180/65.23 |
| 7,551,064 | B2* | 6/2009 | Pudelko | B60R 25/20 |
| | | | | 340/426.36 |
| 7,580,808 | B2* | 8/2009 | Bos | G06Q 10/06 |
| | | | | 73/23.31 |
| 7,921,950 | B2* | 4/2011 | Harris | B60W 20/20 |
| | | | | 180/65.6 |
| 8,346,603 | B2* | 1/2013 | Sakakibara | B60L 53/14 |
| | | | | 702/182 |
| 8,386,148 | B2* | 2/2013 | Hyde | F02D 41/021 |
| | | | | 701/102 |
| 9,631,528 | B2* | 4/2017 | Bradley | F01N 3/00 |
| 10,056,008 | B1* | 8/2018 | Sweany | G09B 19/167 |
| 10,137,885 | B2* | 11/2018 | Stefan | G01C 21/3697 |
| 10,272,909 | B1 | 4/2019 | Melatti et al. | |
| 10,289,651 | B2* | 5/2019 | McQuade | G06F 17/00 |
| 11,544,327 | B2* | 1/2023 | Drubner | G06F 16/906 |
| 11,757,989 | B2* | 9/2023 | Stuart | H04L 67/12 |
| 11,798,093 | B2* | 10/2023 | Banks | G16Y 40/10 |
| 11,816,109 | B2* | 11/2023 | Hisada | G06Q 20/123 |
| 2009/0095549 | A1* | 4/2009 | Dalum | B60L 1/00 |
| | | | | 180/65.265 |
| 2009/0107744 | A1* | 4/2009 | Foersterling | B60K 6/24 |
| | | | | 180/65.6 |
| 2009/0254241 | A1* | 10/2009 | Basir | G06Q 50/40 |
| | | | | 701/31.4 |
| 2011/0202234 | A1* | 8/2011 | Bradley | B60W 10/11 |
| | | | | 477/181 |
| 2013/0073129 | A1* | 3/2013 | Martin | B60L 50/40 |
| | | | | 701/1 |
| 2018/0130034 | A1 | 5/2018 | Taylor et al. | |
| 2019/0311443 | A1* | 10/2019 | Blades | H04L 9/3239 |
| 2020/0346634 | A1* | 11/2020 | Holz | B60W 20/40 |
| 2023/0077695 | A1* | 3/2023 | Ambrosio | B60K 6/40 |
| | | | | 701/22 |

FOREIGN PATENT DOCUMENTS

| | | |
|---|---|---|
| IN | 201644009228 A | 11/2016 |
| IN | 201811037744 A | 4/2020 |

OTHER PUBLICATIONS

NPL, Waeytens, Julie et al., Computer-aided placement of air quality sensors using adjoint framework and sensor features to localize indoor source emission, Science Direct, vol. 144 Building and environment, (2018)( https://pdf.sciencedirectassets.com ) (hereinafter "Waeytens"). (Year: 2018).*
European Search Report dated May 20, 2021 re Appl. No. 20209880.2.
Ford of Europe piloting geofencing and blockchain technology to ensure PHEVs operate efficiently in city center low-emission zones (https://www.greencarcongress.com/2019/10/20191028-ford.html) Oct. 28, 2019.

\* cited by examiner

DYNAMIC CONTROL OF VEHICLE DRIVETRAIN MODES

CROSS-REFERENCE TO RELATED APPLICATION

This patent application claims priority to European Application No. EP 20209880.2 filed Nov. 25, 2020, which is hereby incorporated by reference in its entirety.

BACKGROUND

The topic of emissions and their impact on air quality is increasingly becoming of significant importance to cities and local council authorities. Therefore, as a means of control specific low or zero emission traffic zones as well as congestion zones are being implemented. This is being pursued as public awareness shifts towards expediting technologies that minimize emissions and that meet mandated relevant European legislation. Most often so far, this has taken the form that owners of fossil fuel powered vehicles have to pay a fee in order to access such areas or zones. Series Plug-in-Hybrid vehicles, in particular specifically electric vehicles (EV) with a combustion engine used as a range extender, provide a solution by driving through these zones with emitting zero emissions when operated in full EV mode.

As fixedly implemented low or zero emission traffic zones do not take into account a current air quality, unnecessary restrictions of traffic flow are can occur and result in traffic congestion. Solutions that avoid this include a dynamic generation of low or zero emission traffic zones, taking into account current air quality conditions. This in turn requires in some way a comparison of a vehicle position with the position of the dynamic low or zero emission traffic zone, which is changing with time.

By way of example, U.S. Pat. No. 7,164,986 B2 describes a method and system for tracked device location and route adherence via geofencing. The tracked device may be formed as a vehicle. A method for performing location analysis within a tracked device is provided, comprising: receiving, at the tracked device, a set of coordinates associated with a boundary area; obtaining, at the tracked device, a position of the tracked device; determining, based upon the received coordinates and the detected position of the tracked device, whether the tracked device is located inside the boundary area or outside the boundary area, wherein the set of coordinates include a hysteresis value that adds a predetermined area to the outer periphery of the boundary area once the tracked device is determined to be inside the boundary area; and generating and transmitting an alert signal if the result of the determining step is different from an immediately previous result obtained. The boundary can be a geo-fence boundary comprising a combination of circles and polygons. Further, a method of remotely tracking a tracked device is described, comprising: receiving boundary information; sending the boundary information to the tracked device; receiving an alert from the tracked device regarding the location of the tracked device, wherein the boundary information includes coordinates that define geo-fence boundaries comprising a combination of circles and polygons, the boundary information further includes a hysteresis value specifying a buffer area to the boundaries.

Solutions are known that include an automatic transition between drivetrain modes of a vehicle upon detection of entering and/or exiting a dynamically generated low or zero emission traffic zone.

For instance, Indian application IN 201644009228 proposes a method of operating a hybrid vehicle comprising first and second power sources, the power sources being configured to provide motive power to the vehicle. The method comprises: determining a location of the vehicle; determining if the vehicle is in one or more geo-fenced areas in which use of the first power source of the vehicle is not permitted or is to be minimized; and operating the vehicle under the power of the second power source if it is determined that use of the first power source of the vehicle is not permitted or is to be minimized at the location of the vehicle. The method may further comprise scheduling power resourcing so that the vehicle may be operated under the power of the first power source prior to entering one or more of the geo-fenced areas. The drive power strategy may be dynamically updated during operation of the vehicle. The method may further comprise adjusting the perimeter of the geo-fenced area, e.g. the geo-fenced area may be dynamic in time and/or space. For example, the perimeter of the geo-fenced area may be adjusted in response to environmental conditions, congestion levels or any other factor. The method may further comprise obtaining, e.g. wirelessly, a perimeter of the one or more geo-fenced areas from a server. The server may be configured to broadcast a perimeter of one or more geo-fenced areas, in which use of a first type of vehicle power source is not permitted or desired, to vehicles operating using the method.

Furthermore, GB 25447714 A proposes a vehicle emission control for reduced emission zone, wherein a vehicle is operable in a first emissions mode and a second emissions mode in which at least one emission is reduced for a given drive power. The vehicle is arranged to switch to the second emissions mode automatically upon determining that a current location of the vehicle is within a designated reduced-emission zone. In addition to receiving and storing zone data, the vehicle may use its own sensor to detect exterior air quality. Data from the sensor may be transmitted to an external server. The invention may reduce reliance on a driver being ecologically aware. A method of designating reduced emission zones is also provided, which includes receiving air quality data from a plurality of vehicles.

A method is provided for designating one or more reduced-emission zones at one or more locations. The method comprises: receiving air quality data and location data from a plurality of vehicles; analyzing the air quality data to determine at least one air quality parameter at each of the one or more locations; determining whether to designate a particular location as a reduced-emission zone at least partly based on the air quality parameter at the particular location; and transmitting information regarding designated reduced-emission zones to one or more vehicles.

Further, second air quality data may be received from one or more fixed air monitoring stations; and the second air quality data may be used to determine at least one air quality parameter at each of the one or more locations. Moreover, a real-time notification may be transmitted to a vehicle indicating that the vehicle is within a designated reduced-emission zone.

Moreover, from Indian application IN 201811037744 a system and method for drive mode switching in vehicles based on the air quality in the area of travel is known. Air quality data in an area is mined from any or a combination of sensors locates on site, vehicle sensors monitoring emission and industrial sensors monitoring emission.

The system comprises a non-transitory storage device having embodied therein one or more routines operable to enable air quality-based drive mode switching in vehicles;

and one or more processors coupled to the non-transitory storage device and operable to execute the one or more routines. The one or more routines include an air quality information receiving unit, which when executed by the one or more processors, receives, from one or more sensors it is operatively coupled with, air quality information selected from any or a combination of particulate matter, carbon emissions and nitrogen emissions, and receives, from a public database, which may be a cloud-based server, it is operatively coupled with, zones of designated low pollution; an air quality mapping unit, which when executed by the one or more processors, receives, from a vehicle it is operatively coupled with, a proposed route map of travel for the vehicle, wherein the air quality information is overlaid on the proposed route map to generate an air quality map along the route of the vehicle; and a drive mode switching unit, which when executed by the one or more processors, issues, to the vehicle, a signal to switch from a current drive mode to a revised drive mode for the vehicle in an area of high pollution.

Also from DE 10 2013 223 331 A1 a method is known for controlling at least one of at least two propulsion systems of a vehicle, which differ with regard to their environmental emissions, based on first data, which characterize the emission sensitivity of the surroundings of the vehicle, and based on second data, which characterize the emission sensitivity of a region, through which a travel route of the vehicle is running.

A so-called air quality map can also be generated. Here, data from air quality sensors from a large number of vehicles are recorded and transmitted to a central server. In addition, data from stationary air quality sensors can be transmitted to the server. The server then generates the air quality map from the transmitted data. Data interfaces of the vehicles can call up the current air quality of the relevant area for certain areas and determine the emission sensitivity of the corresponding region as a function of the values for the air quality. This ensures that the drive system of the vehicle is controlled as a function of the current air quality of a region which is still to be driven through. Since the values for the air quality can change constantly, the selection of the drive system in the vehicle is currently selected based on the current value of the air quality in a region still to be driven through.

The type of drivetrain engaged in vehicles driving through a dynamically set up low-emission or zero-emission zone must be identifiable and checkable in a forgery-proof manner. Solutions that have been proposed in the art include the use of blockchain technology.

For instance, in the poster contribution "*Ford of Europe piloting geofencing and blockchain technology to ensure PHEVs operate efficiently in city center low-emission zones*", posted on the internet platform "greencarcongress.com" on 28 Oct., 2019, a study is announced to investigate how innovative geofencing and blockchain technology could help to accurately track and increase the number of so-called "green miles" driven by vehicles, in which blockchains are used to create permanent time-stamped records of data which are saved on multiple computers and which constantly grows as new records or "blocks" are added. Further, geofencing is used to create a virtual geographic boundary defined by GPS technology. By making use of dynamic geofencing technology, the vehicles can adapt in real time to changes in emissions zones. A plug-in device enables the geofencing and blockchain capabilities. Whenever a vehicle enters a controlled zone, its electric-drive mode is triggered and the zero-emission driving green miles are documented. The emission modes and time that vehicles enter or leave a controlled zone are recorded to a secure distributed ledger—a blockchain—ensuring emissions data are safely stored and shared among relevant parties including city authorities and the vehicle or fleet owners.

Furthermore, the use of blockchain technology for forgery-proof execution of financial transactions such as so-called smart contracts has been proposed in the prior art.

US 2018/0130034 A1 for example describes extended blockchains for event tracking and management, and in particular methods for providing cryptographically secure supply chains for uniquely labeled or uniquely identifiable discrete products that can incorporate role-based digital wallets and multiple synchronized transactional blockchains. The wallet functionality can be embodied in the term "smart contracts." This feature enhances the user's ability to code contingencies on the transaction, for example, a second signature, a waiting time, or a specified third party data point, such as the outcome of a sporting contest.

A computer-implemented method for storing transactional data in multiple blockchains comprises performing by a computer the steps of:
receiving transactional information comprising a plurality of data fields for a transaction, wherein a first one of the data fields comprises first data for the transaction defined using a first unit of account and wherein a second one of the data fields comprises second, different data for the same transaction defined using a second unit of account, wherein the transaction comprises a transfer of custody of a physical item, the physical item having associated therewith a unique identifier obtainable from a machine-readable code or device included in or on the physical item or packaging of the physical item; creating a first block including at least the first data for the transaction defined using the first unit of account; causing the first block to be added to a first blockchain that uses the first unit of account to track transactions; creating a second block including at least the second data for the transaction defined using the second unit of account and not requiring inclusion of the first data for the transaction defined using the first unit of account; causing the second block to be added to a second, separate blockchain that uses the second unit of account to track transactions, wherein the first blockchain and the second blockchain each track a different subset of data fields of the transaction; and validating a chain of custody of the physical item transferred in the transaction, wherein the validating comprises: receiving the unique identifier associated with the physical item following a machine reading of the code or device included in or on the physical item or packaging of the physical item; using the unique identifier to identify one or more indices of blocks in at least one of the first and second blockchains that demonstrate ownership of the physical item; retrieving encrypted blocks from at least one of the first and second blockchains corresponding to the identified indices; and verifying a hash associated with the encrypted blocks and decrypting at least one of the encrypted blocks using a private key.

In view of the prior art, the field of control of drivetrains operated in hybrid vehicles passing through a dynamically established low or zero emission traffic zone offers room for improvement.

SUMMARY

The present disclosure includes a computer-implemented method for establishing at least one low or zero emission traffic zone and for controlling and monitoring a dynamically operated drivetrain of hybrid vehicles passing through the at least one established low or zero emission traffic zone. The disclosure further provides a system configured to execute such method, and to a computer program to cause such system to execute such method.

The low or zero emission traffic zones are dynamically established in dependence of, i.e., based on, air quality. In particular, forgery-proof evidence can be provided for complying to currently prevailing environmental traffic regulations.

It should be noted that the features and measures listed individually in the following description can be combined with one another in any technically meaningful manner and show further embodiments of the invention, which is limited only by the claims. The description additionally characterizes and specifies the invention in particular in connection with the figures.

In one aspect, a computer-implemented method is provided for establishing at least one low or zero emission traffic zone and for controlling and monitoring a dynamically operated drivetrain of hybrid vehicles passing through the at least one established low or zero emission traffic zone.

The method includes at least the following steps:
acquiring data from a plurality of air quality-sensitive sensors placed within a region that includes the at least one low or zero emission traffic zone to be established,
operating a cloud-based service for evaluating the acquired data regarding air quality based on at least one predetermined condition,
depending on (i.e., based on) the result of the step of evaluating, wirelessly transmitting signals representative of a location and a shape of the at least one low or zero emission traffic zone to at least one hybrid vehicle that is approaching or driving within the region,
based on a fulfillment of at least one predetermined condition related to the transmitted signals and a current position of the hybrid vehicle with regard to or within the at least one established low or zero emission traffic zone at that time, actuating a vehicle-based mode transition for at least initiating a change of a drivetrain mode of the hybrid vehicle at least to an electric mode,
generating a blockchain data block that at least includes data regarding the current position of the hybrid vehicle and data regarding the dynamically operated drivetrain of the hybrid vehicle, and
adding the generated blockchain data block to a blockchain residing in a blockchain system.

Advantages of the method in accordance with the invention lie in that
a current air quality can be taken into account for establishing dynamic low or zero emission traffic zones (i.e. for dynamic geo-fencing) in a flexible and effective manner for improved air quality and for reducing unnecessary restrictions of traffic flow to a minimum to avoid traffic congestion,
an effort for setting up low or zero emission traffic zones by road signs and/or a camera-based surveillance system can become unnecessary, and
an operation of drivetrains that are operated in hybrid vehicles at the moment of passing through dynamically established low or zero emission traffic zones can be monitored in a forgery-proof manner in a process that is fully transparent to all process participants/stakeholders.

Preferably, the data from the plurality of air quality-sensitive sensors placed within a region are acquired as real-time data or as near real-time data, which in the context of the present invention shall particularly be understood such that the data are processed within a time that allows for wirelessly transmitting signals representative of a location and the shape of the at least one low or zero emission traffic zone to at least one hybrid vehicle in time enough to be able to react appropriately with regard to a change of the drivetrain mode.

Preferably, at least the step of wirelessly transmitting signals representative of a location and a shape of the at least one low or zero emission traffic zone is repeated in a periodic manner. With a suitably chosen time period it can be ensured that hybrid vehicles that are approaching the region or driving within receive the information about a current status of the at least one low or zero emission traffic zone.

In embodiments of the method, the at least one predetermined condition in the step of evaluating the acquired data regarding air quality comprises to exceed a predetermined threshold or predetermined thresholds regarding at least one air quality parameter. In this way, a flexible decision-making process for establishing the at least one low or zero emission traffic zone can be provided, which allows for implementing a weighting function in dependence of various air pollutants to derive a severity level of air pollution as a measure.

Preferably, the step of evaluating comprises assigning a predetermined value for at least one air quality parameter to every location outside the region and within a predetermined distance to a boundary of the region. By that, it can be ensured that in the step of evaluating an area outside the region does not become part of an established low or zero emission traffic zone. Further, smooth transitions of evaluation results regarding air quality can be achieved at peripheral parts of the established low or zero emission traffic zone that are close to the boundary of the region.

In embodiments of the method, the step of evaluating comprises
applying linear interpolation procedures to data acquired from adjacently located air quality-sensitive sensors,
applying linear interpolation procedures between data acquired from air quality-sensitive sensors located close to a boundary of the region and a predetermined value for at least one air quality parameter that has been assigned to every location outside the region and within a predetermined distance to a boundary of the region, and
a subsequent step of applying a spatial Gaussian filter function to the results of the interpolation.

In this way, a spatial resolution of the evaluation results regarding air quality can be improved compared to a spatial resolution given by a characteristic/typical distance between air quality-sensitive sensors.

In embodiments, the method includes an additional step of evaluating at least one generated blockchain data block (in the following also referred to as "data block" for briefness) as part of a smart contract application. Smart contracts are software-based contracts for which a large variety of contractual conditions can be lodged. By executing smart contract applications in combination with the blockchain, forgery-proof payments, for instance pertaining to emission-dependent entering or crossing of a low or zero emission traffic zone, can automatically and readily be invoiced.

In another aspect, a system is provided for establishing at least one low or zero emission traffic zone within a region and for controlling and monitoring dynamically operated drivetrains of a hybrid vehicles passing through the at least one established low or zero emission traffic zone.

The system includes
- a plurality of air quality-sensitive sensors placed within a region that are configured for wirelessly transmitting sensor data,
- a cloud-based data store device configured to receive the transmitted sensor data and to execute the step of acquiring data as part of an embodiment of the method disclosed herein,
- a cloud-based computing device configured to execute the step of evaluating the acquired data as part of an embodiment of the method disclosed herein,
- transmitter device configured to execute the step of wirelessly transmitting signals representative of a location and a shape of the at least one low or zero emission traffic zone as part of an embodiment of the method disclosed herein,
- for each hybrid vehicle, a vehicle-based positioning system that is configured to check on a fulfillment of at least one predetermined condition related to the transmitted signals and a current position of the vehicle with regard to or within the at least one established low or zero emission traffic zone at that time,
- for each hybrid vehicle, a vehicle-based electronic control unit that is operatively connected to the vehicle-based positioning system for receiving results from the check on a fulfillment of the at least one predetermined condition, and that is further configured to execute the steps of operating a vehicle-based mode transition device to at least initiate a change of a drivetrain mode of the hybrid vehicle to electric mode and of generating a blockchain data block as parts of an embodiment of the method disclosed herein.

In the this document, the phrase "being configured to", means being specifically programmed, laid out, furnished or arranged.

The benefits described beforehand in context with the disclosed method apply to the proposed system to the full extent.

It is evident to those skilled in the art that the various components of the proposed system, although being configured to operatively interact as described beforehand, usually form part of distinct apparatuses or systems that may serve an own purpose, for instance of an air quality surveillance system, a cloud-based computer system, a radio frequency transmitter and a hybrid vehicle. Likewise, the various components will not normally belong to the same owner, but rather to a plurality of different owners.

For instance, the plurality of air quality-sensitive sensors can be owned by a service company and can be operated and maintained by the service company under contract with a local council authority. Further, the service company may operate the cloud-based service for evaluating the air quality data and may offer the results at a digital marketplace, where the information can be purchased and utilized by third parties. Regardless of this, other constellations are also conceivable.

In embodiments of the system, the vehicle-based electronic control unit is configured for initiating a change of a drivetrain mode of the hybrid vehicle to electric mode as part of an embodiment of the method disclosed herein by generating an output signal. By using a suitable embodiment of the output signal and transferring the output signal to a higher-ranking vehicle control unit, the change of the drivetrain mode of the hybrid vehicle can readily be accomplished in an effective manner.

Preferably, the system includes a blockchain system that is configured to execute the step of adding the generated blockchain data block to a blockchain as part of an embodiment of the method disclosed herein. In this way, fast and secure data processing can be achieved, and an effort for otherwise required complex handling protocols and safety interfaces can be avoided.

Further preferred, the blockchain system is cloud-based. In this way, all process participants/stakeholders can readily be provided with a shared read and write access without the necessity of a central instance to make new entries to the blockchain.

In preferred embodiments of the system, the plurality of air quality-sensitive sensors comprises at least a subgroup of sensors that is at least sensitive to (i.e., can detect) particulate matter. In this way, one of the main sources of air pollution from vehicle traffic can be detected. Most preferably, the subgroup of sensors is at least sensitive to particulate matter having an aerodynamic diameter between 2.5 micrometers ($\mu m$) and 10 $\mu m$.

Preferably, the sensors of the plurality of air quality-sensitive sensors are arranged at locations that occupy vertices of a virtual, two-dimensional grid. The term "grid" shall be understood in the sense of the present invention to encompass structured grids, such as curvilinear grids, rectilinear grids and regular grids, as well as unstructured grids, in which for instance the vertices form edges of triangles. Most preferably, the virtual, two-dimensional grid is formed as a two-dimensional regular grid.

In yet another aspect, a computer program is provided. The computer program comprises instructions to cause an embodiment of the system disclosed herein to execute steps of an embodiment of the method disclosed herein.

The computer program can enable an automatic, robust and reliable execution of the method and can allow for a fast modification of method steps, if so desired.

BRIEF SUMMARY OF THE DRAWINGS

These and other aspects of the present disclosure will be apparent from and elucidated with reference to the embodiment or the embodiments and attached drawings described hereinafter, wherein.

DESCRIPTION

Figure 1:
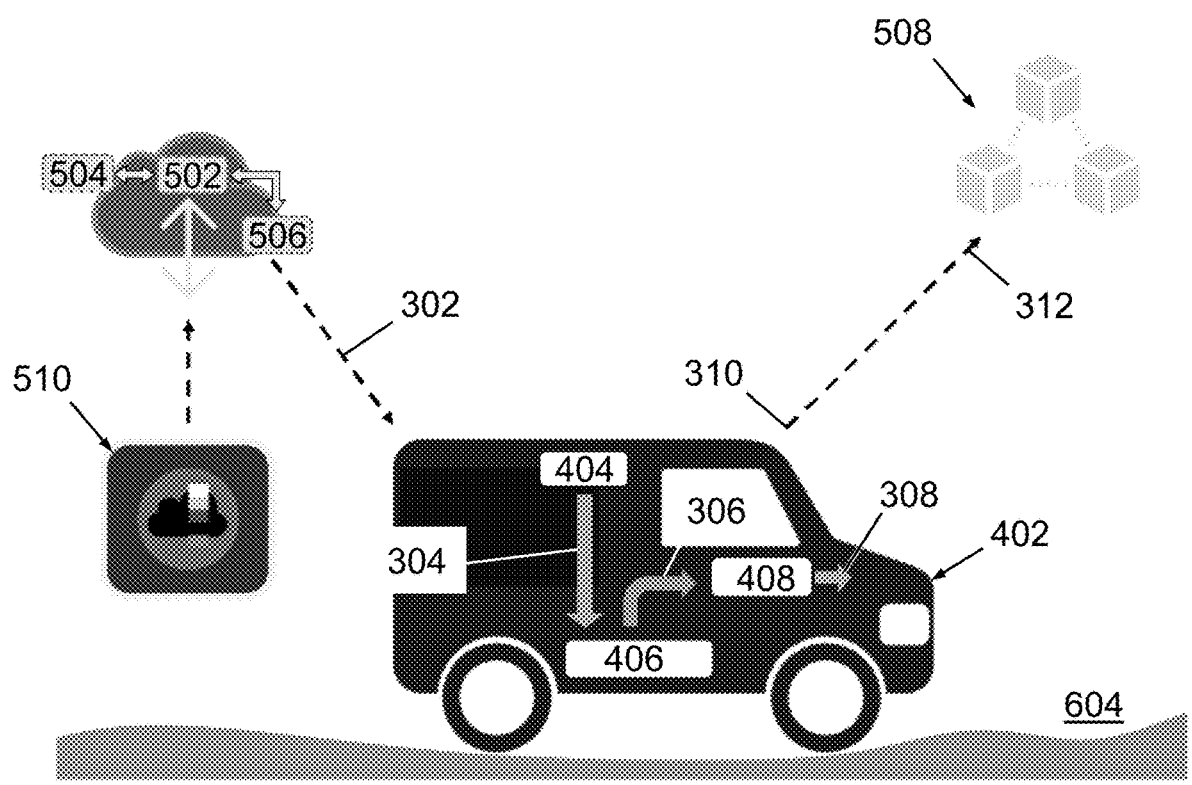
FIG. 1 schematically shows a possible embodiment of a system for establishing at least one low or zero emission traffic zone within a region and for controlling and monitoring dynamically operated drivetrains of hybrid vehicles passing through the at least one established low or zero emission traffic zone.

In the different figures, parts that are the same are always denoted by the same reference numeral, for which reason they are usually described only once.

FIG. 1 schematically shows a possible embodiment of a system for establishing at least one low or zero emission traffic zone within a region, i.e., geographic area, and for controlling and monitoring dynamically operated drivetrains of hybrid vehicles 402 passing through the at least one established low or zero emission traffic zone.

The system includes a plurality of air quality-sensitive sensors 510, i.e., sensors that detect air quality, that are placed within the region. The plurality of air quality-sensitive sensors 510 comprises a subgroup of sensors that is at least sensitive to particulate matter. In this embodiment, the subgroup equals the complete plurality of sensors 510. In other embodiments, the subgroup may be a real subset of the plurality of air quality-sensitive sensors 510.

Figure 2:
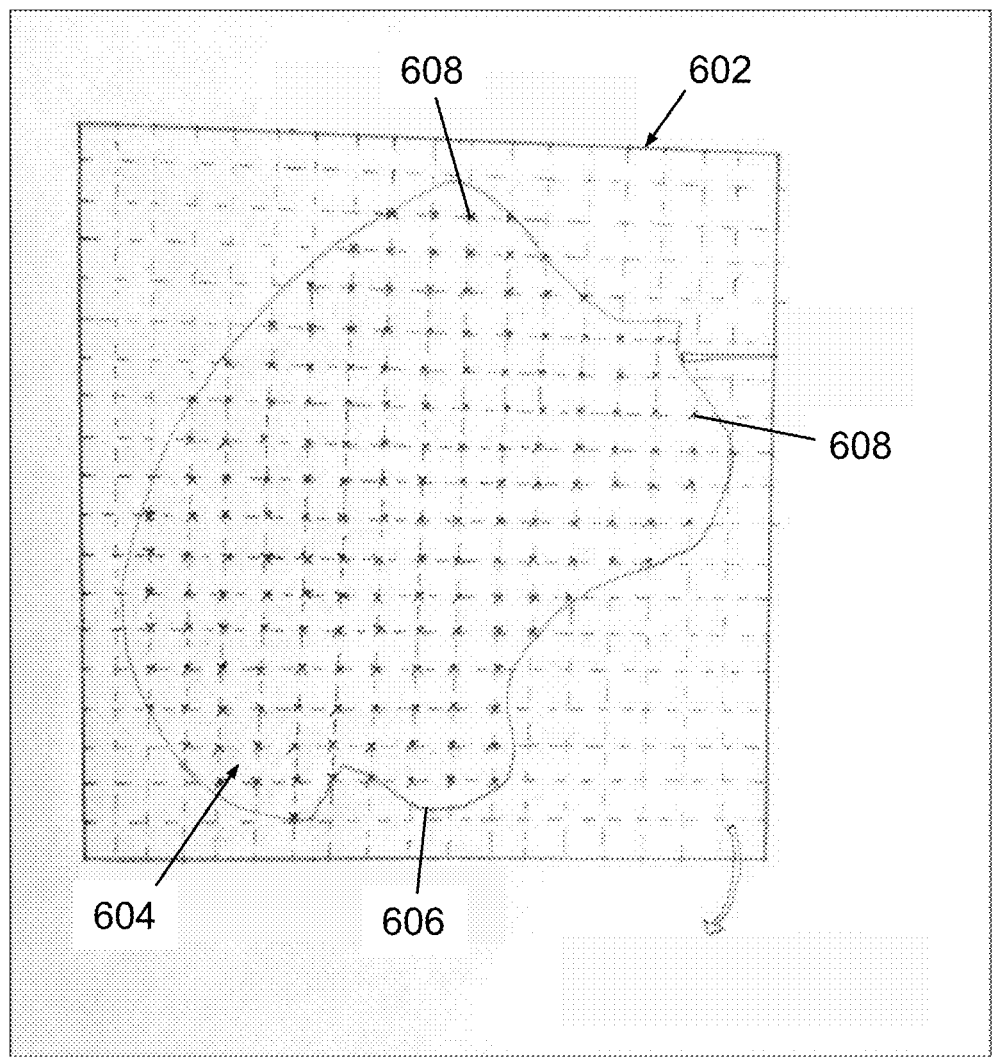
FIG. 2 is a schematic illustration of a possible embodiment of a plurality of air quality-sensitive sensors of the system pursuant to FIG. 1, placed within a region that includes a low or zero emission traffic zone to be established by the system.

FIG. 2 is a schematic illustration of a possible embodiment of the plurality of air quality-sensitive sensors 510 of the system pursuant to FIG. 1, placed within a region 604 that includes at least one low or zero emission traffic zone to be established by the system. The region 604 is a defined area of interest, which is embedded in a rectangular-shaped urban area 602 and may have been defined by a local authority on the basis of a necessity of keeping an air quality level above a predefined level. The sensors of the plurality of air quality-sensitive sensors 510 are arranged at locations that occupy vertices 608 of a virtual, two-dimensional grid, which in this example is formed as a regular, two-dimensional Cartesian grid. In other embodiments, other types of grids may as well be used to locate the sensors of the plurality of air quality-sensitive sensors 510 within the region 604.

The distance between two adjacent vertices 608 may be chosen in dependence of the dimensions of the region 604, for instance between 50 meters (m) and 1 kilometer (km). As a measure for keeping the air quality level above a predetermined level, the air quality parameter given by the concentration of particulate matter as sensed by the air quality-sensitive sensors 510 is considered. For keeping the air quality level above a predetermined level, the concentration of particulate matter has to be the lower than a predetermined threshold for the concentration.

Referring again to FIG. 1, the air quality-sensitive sensors 510 are configured for wirelessly transmitting sensor data. The system further includes cloud-based data store 502 that are configured for receiving the transmitted sensor data. The cloud-based data store 502 is operatively coupled to cloud-based computing device 504. The cloud-based computing device 504 may form, for instance, part of a database server residing in a cloud environment.

Further, the system comprises transmitter device 506, which may be designed as radio frequency antennas. The transmitter device 506 are operatively coupled to the cloud-based computing device 504 and are configured for wirelessly transmitting signals, as will be described thereinafter.

In FIG. 1, a vehicle is exemplarily shown for a plurality of vehicles that may be approaching the region 604 or may already be driving within the region 604. The vehicle is formed as an electric hybrid vehicle 402 comprising an electric hybrid drivetrain with a conventional combustion engine and an electric motor (not shown), which may be arranged in a parallel hybrid or series hybrid configuration (range-extended electric vehicles, REEV). Thus, the hybrid vehicle 402 can be operated in a combustion engine drivetrain mode (combustion mode), in which the combustion engine is the source of propulsion, and in an electric drivetrain mode (electric mode), in which the electric motor is the source of propulsion.

As will be understood, when the hybrid vehicle 402 is operated in the electric mode, the amount of directly emitted air pollutants, and in particular the amount of emitted particulate matter, is zero. A transition between the combustion mode and the electric mode can be executed by vehicle-based mode transition device 408 of the hybrid vehicle 402.

The hybrid vehicle 402 is equipped with a vehicle-based positioning system 404, for instance a global positioning system (GPS). The vehicle-based positioning system 404 is configured to provide position information to the hybrid vehicle 402 and is further configured for receiving, among other signals, the wirelessly transmitted signals from the system transmitter device 506.

Operatively connected to the vehicle-based positioning system 404 is a vehicle-based electronic control unit 406 of the hybrid vehicle 402. The electronic control unit 406 is further operatively connected with the vehicle-based mode transition device 408. Operative connections of the described components within the hybrid vehicle 402 can, for instance, be provided by CAN (Controller Area Network) bus connections, as is known.

Moreover, the system comprises a cloud-based blockchain system 508 providing distributed ledger options to process stakeholders. The vehicle-based electronic control unit 406 is operatively connected with the cloud-based blockchain system 508.

In the following, a possible embodiment of a method for establishing at least one low or zero emission traffic zone within the region 604 and for controlling and monitoring a dynamically operated drivetrain of hybrid vehicles 402 passing through the at least one established low or zero emission traffic zone by operating the system pursuant to FIG. 1 is described. The method will be described in general with reference to FIGS. 1 and 3, in which a flow chart of details of geofencing steps of the possible embodiment of the computer-implemented method in accordance with the invention is provided. In preparation of operating the system, it shall be understood that all involved units and devices are in an operational state and in general configured as illustrated in FIG. 1.

In order to be able to carry out the method automatically and in a controlled way, each one of the system main components comprises a software module of a distributed computer program where appropriate. The method steps to be conducted are converted into instructions of the respective software module, which are executable by the respective system component.

Figure 3:
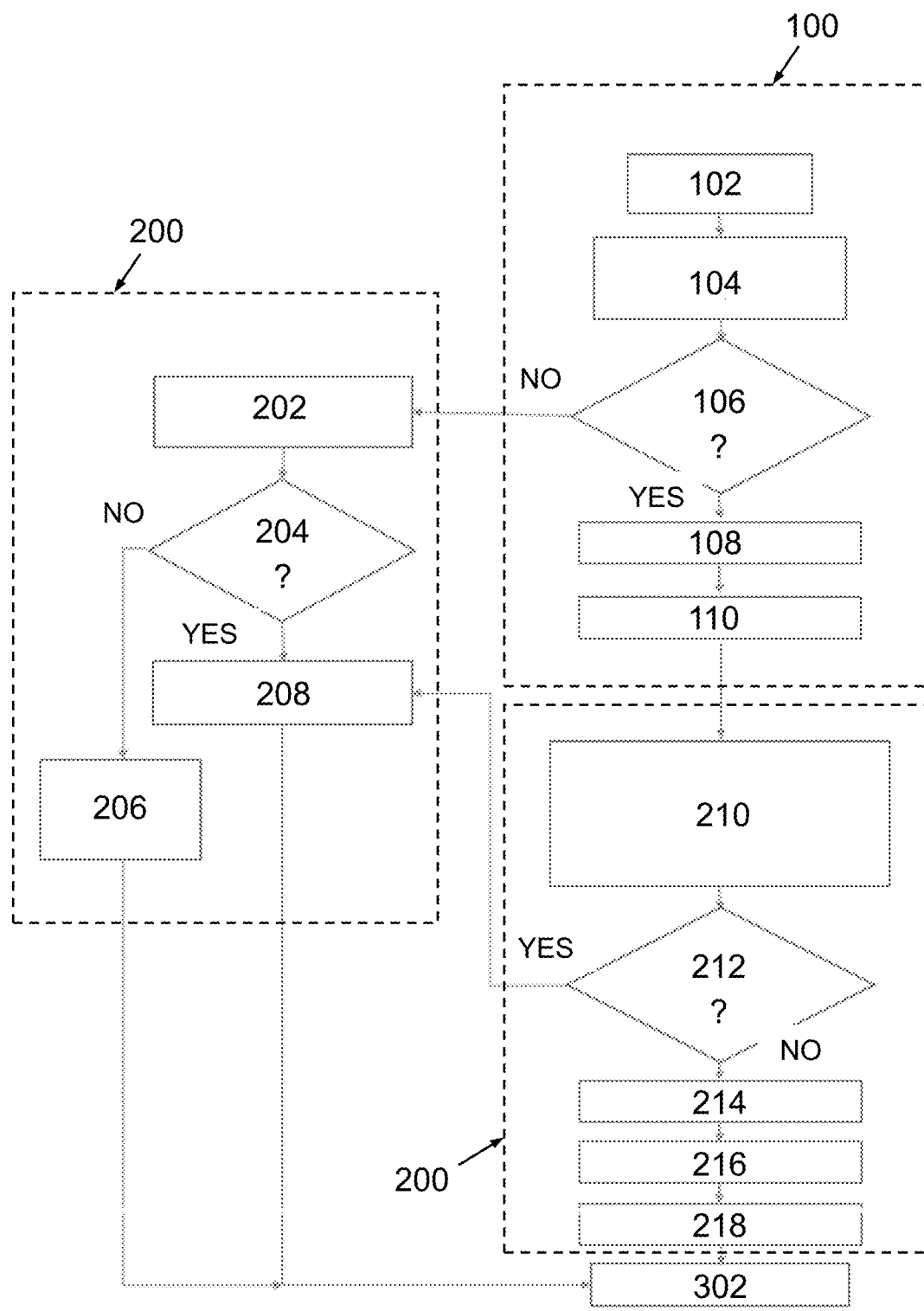
FIG. 3 is a flow chart of details of geofencing steps of the possible embodiment of the computer-implemented method.

FIG. 3 shows a flow chart of details of geofencing steps of the specific possible embodiment of the computer-implemented method.

When the region 604 has been defined by a local council authority on the basis of a necessity of keeping an air quality level above a predetermined level, a number of preparing steps 100 is executed. A cloud-based service is operated to execute the preparing steps 100 as well as to execute evaluation steps 200 based on predetermined conditions regarding air quality on acquired data. The cloud-based service may be provided by executing an appropriate software module of the computer program on the cloud-based computing device 504.

As a first preparing step 102, the geographic position of the defined region 604, which for instance may be given by geographic coordinates of a suitable number of locations of a perimeter or boundary 606 of the region 604, has been retrieved from a databank. In a next preparing step 104, the cloud-based service determines a largest lateral span of the region 604, and compares the determined largest lateral span with an average distance between two adjacent vertices 608 of the grid of air-sensitive sensors 510 in a next comparison step 106.

If the largest lateral span of the region 604 is smaller than the average distance, only data from the air-sensitive sensor 510 that is located closest to a centroid of the region 604 will be considered in the evaluation of the acquired data.

In this case, in a step 202 of the method, data will be acquired in the future from the air quality-sensitive sensor 510 that is located closest to the centroid of the region 604. For evaluation purposes, the acquired data are compared with the predetermined threshold for the concentration of particulate matter in a method step 204. If the concentration of particulate matter is lower than the predetermined threshold for the concentration, an information is generated indicating that no geo-fencing was performed as a result of the evaluation in another step 206. If the concentration of particulate matter is equal to or larger than the predetermined threshold for the concentration, an information is generated indicating that the entire region 604 is established as a low or zero emission traffic zone in another step 208.

If the largest lateral span of the region 604 is equal to or larger than the average distance between two adjacent vertices 608 of the grid of air-sensitive sensors 510, the defined region 604 is supplemented in another preparing step 108 by an area including every location outside the region 604 lying within a predetermined distance to the boundary 606 of the region 604. The predetermined distance may be chosen between 50 m and 1 km, depending on the specifics of the region 604. A predetermined value for the concentration of particulate matter is assigned to every location of the supplement area in another step 110. The predetermined value is chosen to be smaller than the predetermined threshold for the concentration of particulate matter by a fixed amount.

In this case, in a step 210 of the method data will be acquired in the future from the air-sensitive sensors 510 located within the defined region 604 for evaluation purposes. In another step 212 of comparison, data from each of the air-sensitive sensors 510 is compared to the predetermined threshold for the concentration of particulate matter. If all data from the air-sensitive sensors 510 represent values that are larger than the predetermined threshold, the entire region 604 will be geo-fenced as a result of the evaluation in another step 208. If not all data from the air-sensitive sensors 510 show values that are larger than the predetermined threshold, linear interpolation procedures are applied to data acquired from adjacently located air quality-sensitive sensors 510 in another method step 214. This step 214 also includes applying linear interpolation procedures between data acquired from air quality-sensitive sensors 510 located close to the boundary 606 of the region 604 and the predetermined value for the concentration of particulate matter as assigned to every location of the supplement area. In a subsequent step 216, a spatial Gaussian filter function is applied to the results of the interpolation. By applying one of the well-known numerical subroutines for contouring to the interpolated data, a size and shape of the portion of the region 604 whose concentration of particulate matter is higher than the predetermined threshold are determined in another step 218 as a result of the evaluation steps 200.

After executing the evaluation steps 200 on the acquired data, the transmitter device 506 is operated in another step 302 of the method to wirelessly transmit signals representative of a location and a shape of the low or zero emission traffic zone to the hybrid vehicles 402 that are approaching or driving within the region 604 (FIG. 1). The transmitted signals are adapted in dependence of the result of the evaluation steps 200. The step 302 of wirelessly transmitting signals representative of a location and a shape of the established low or zero emission traffic zone is repeated in a periodic manner, for instance once in each second, to ensure timely provision of the information to all hybrid vehicles 402 that are approaching or driving within the region 604.

The vehicle-based positioning system 404 receives the transmitted signals (FIG. 1) and is configured to check in a step 304 a fulfillment of a set of predetermined conditions related to the transmitted signals and a current position of the hybrid vehicle 402 with regard to or within the established low or zero emission traffic zone at that time. The set of predetermined conditions may include whether the hybrid vehicle 402 crosses a predefined maximum distance to a perimeter of the established low or zero emission traffic zone. The set of predetermined conditions may include whether the hybrid vehicle 402 is driving within the established low or zero emission traffic zone. The set of predetermined conditions may include whether the hybrid vehicle 402 has approached the perimeter of the established low or zero emission traffic zone from inside the low or zero emission traffic zone to a distance of less than a predetermined value. The set of predetermined conditions may include whether the hybrid vehicle 402 has exited the established low or zero emission traffic zone from inside the low or zero emission traffic zone up to a distance of more than a predetermined value. As those skilled in the art will readily understand, the set of predetermined conditions may as well include predetermined conditions comprising further parameters or other combinations thereof.

The vehicle-based electronic control unit 406 is operatively connected to the vehicle-based positioning system 404 for receiving results from the method step of checking on a fulfillment of one or more of the set of predetermined conditions 304. Based on a fulfillment of one or more of the set of predetermined conditions, the vehicle-based electronic control unit 406 generates an appropriate output signal in another step 306. The output signal is provided to the vehicle-based mode transition device 408 to cause the vehicle-based mode transition device 408 to be operated to initiate a change of a drivetrain mode of the hybrid vehicle 402 at least to electric mode in another step 308.

For instance, when the hybrid vehicle 402 crosses a predefined maximum distance to the perimeter of the established low or zero emission traffic zone, the vehicle-based mode transition device 408 is operated for initiating a change of a drivetrain mode of the hybrid vehicle 402 from combustion mode to electric mode. As another example, when the hybrid vehicle 402 has exited the established low or zero emission traffic zone from inside the low or zero emission traffic zone up to a distance of more than a predetermined value, the vehicle-based mode transition device 408 may be operated to initiate a change of a drivetrain mode of the hybrid vehicle 402 from electric mode to combustion mode. In this case, the driver of the hybrid vehicle 402 may also be prompted beforehand to confirm an intended change of the drivetrain mode.

In another step 310 of the method, a blockchain data block is generated by the vehicle-based electronic control unit 406. The data block includes data regarding the current position of the hybrid vehicle 402 with regard to the established low or zero emission traffic zone at that time from the vehicle-based positioning system 404, and data regarding the dynamically operated drivetrain of the hybrid vehicle 402 from the vehicle-based mode transition device 408. In a following step 312, the cloud-based blockchain system 508 adds the generated data block to the blockchain, which resides in the cloud-based blockchain system 508.

As an optional step of the method, the generated data block may be evaluated as part of a smart contract application, for instance for automatic and forgery-proof invoicing of emission-dependent entering or crossing of a low or zero emission traffic zone.

While the invention has been illustrated and described in detail in the drawings and foregoing description, such illustration and description are to be considered illustrative or exemplary and not restrictive. The invention is not limited to the disclosed embodiments.

LIST OF REFERENCE NUMERALS 100 preparing steps
102 retrieve geographic position of region
104 determine largest lateral span of region
106 compare lateral span with average grid vertex distance
108 supplement region by outside area
110 assign predetermined concentration value to supplement area
200 data evaluation steps
202 acquire data for region centroid
204 compare data with concentration threshold
206 generate information of no geo-fencing
208 generate information of entirely geo-fenced region
210 acquire data from air-sensitive sensors in region
212 compare data with concentration threshold
214 apply linear interpolation procedures
216 apply spatial Gaussian filter
218 contour data to determine region portion of restricted emission traffic zone
302 transmit location and shape of restricted emission traffic zone
304 check current position with regard to restricted emission traffic zone
306 generate output signal
308 operating device to change drivetrain mode
310 generate blockchain data block
312 add data block to blockchain
402 hybrid vehicle
404 vehicle-based positioning system
406 vehicle-based electronic control unit
408 vehicle-based mode transition device
502 cloud-based data store
504 cloud-based computing device
506 transmitter device
508 cloud-based blockchain system
510 air quality-sensitive sensor
602 urban area
604 region
606 boundary
608 vertex

The invention claimed is:

1. A system, comprising:
a plurality of air quality sensors placed within a geographic area and configured for wirelessly transmitting sensor data, wherein the sensors of the plurality of air quality sensors are arranged at locations that occupy vertices of a virtual, two-dimensional grid, wherein a distance between adjacent vertices is chosen in dependence of dimensions of the geographic area;
a cloud-based computing device configured to:
acquire data from the air quality sensors placed within the geographic area;
evaluate the acquired data for air quality based on at least one predetermined condition;
assign predetermined values for at least one air quality parameter to respective locations outside the geographic area and within a predetermined distance of a boundary of the geographic area; and
based on the evaluated air quality, cause a wireless transmission of a location and a shape of at least one low or zero emission traffic zone to a hybrid vehicle that is approaching or driving within the geographic area;
a positioning system in the hybrid vehicle that is configured to determine whether at least one predetermined condition is met based on the wireless transmission and a current position of the hybrid vehicle with regard to or within the at least one established low or zero emission traffic zone at a current time; and
an electronic control unit (ECU) in the hybrid vehicle operatively connected to the positioning system to receive the determination whether the at least one predetermined condition is met, and to generate a blockchain data block that at least includes the current position of the hybrid vehicle and data regarding a dynamically operated drivetrain of the hybrid vehicle, and to add the generated blockchain data block to a blockchain.

2. The system of claim 1, wherein the ECU is further configured to initiate a change of a drivetrain mode of the hybrid vehicle to an electric mode.

3. The system of claim 1, wherein the could-based computing device is further configured to:
apply linear interpolation procedures to data acquired from adjacently located air quality sensors;
apply linear interpolation procedures between data acquired from air quality sensors located close to a boundary of the geographic area and a predetermined value for at least one air quality parameter that has been assigned to respective locations outside the geographic area and within a predetermined distance of a boundary of the geographic area; and
then apply a spatial Gaussian filter function to the results of the interpolation.

4. The system of claim 3, wherein the plurality of air quality sensors includes a sensor that detects particulate matter.

5. The system of claim 1, wherein the hybrid vehicle is one of a plurality of hybrid vehicles approaching or driving within the geographic area.

6. The system of claim 3, wherein the blockchain is cloud-based.

7. A computer-implemented method for establishing at least one low or zero emission traffic zone and for controlling and monitoring a dynamically operated drivetrain of a hybrid vehicle passing through the at least one low or zero emission traffic zone, the method comprising:
acquiring data from a plurality of air quality sensors placed within a geographic area that includes the at least one low or zero emission traffic zone, wherein the sensors of the plurality of air quality sensors are arranged at locations that occupy vertices of a virtual, two-dimensional grid, wherein a distance between adjacent vertices is chosen in dependence of dimensions of the geographic area;
operating a cloud-based service that evaluates the acquired data regarding air quality based on at least one predetermined condition, including assigning a predetermined value for at least one air quality parameter to respective locations outside the geographic area and within a predetermined distance of a boundary of the geographic area;

based on a result of the evaluating, wirelessly transmitting a location and a shape of the at least one low or zero emission traffic zone to the hybrid vehicle as it is approaching or driving within the geographic area;

based on determining whether at least one predetermined condition related to the transmitted signals is met, and a current position of the hybrid vehicle with regard to or within the at least one established low or zero emission traffic zone at a current time, operating a vehicle-based mode transition to initiate a change of a drivetrain mode of the hybrid vehicle to an electric mode;

generating a blockchain data block that at least includes data regarding the current position of the hybrid vehicle and data regarding the dynamically operated drivetrain of the hybrid vehicle; and adding the generated blockchain data block to a blockchain.

8. The method of claim 7, wherein wirelessly transmitting the location and shape of the at least one low or zero emission traffic zone is periodically repeated.

9. The method of claim 7, wherein the at least one predetermined condition includes exceeding one or more predetermined threshold or predetermined thresholds for at least one air quality parameter.

10. The method of claim 7, wherein the evaluating comprises:
applying linear interpolation procedures to data acquired from adjacently located air quality sensors;
applying linear interpolation procedures between data acquired from air quality sensors located close to a boundary of the geographic area and a predetermined value for at least one air quality parameter that has been assigned to every location outside the geographic area and within a predetermined distance of a boundary of the geographic area; and
a subsequent step of applying a spatial Gaussian filter function to the results of the interpolation.

11. The method of claim 7, wherein the hybrid vehicle is one of a plurality of hybrid vehicles approaching or driving within the geographic area.

* * * * *